(12) United States Patent
Abertini

(10) Patent No.: US 6,356,416 B1
(45) Date of Patent: Mar. 12, 2002

(54) ASSEMBLY COMPRISING AT LEAST ONE EMBEDDED CHIP WITH MAGNETIC HEAD (S)

(75) Inventor: Jean-Baptiste Abertini, Grenoble (FR)

(73) Assignee: Alditech, Grenoble (FR)

( * ) Notice: Subject to any disclaimer, the term of this patent is extended or adjusted under 35 U.S.C. 154(b) by 0 days.

(21) Appl. No.: 09/509,825

(22) PCT Filed: Aug. 20, 1999

(86) PCT No.: PCT/FR99/02021
§ 371 Date: Apr. 20, 2000
§ 102(e) Date: Apr. 20, 2000

(87) PCT Pub. No.: WO00/11666
PCT Pub. Date: Mar. 2, 2000

(30) Foreign Application Priority Data

Aug. 21, 1998 (FR) .............................................. 98 10615

(51) Int. Cl.[7] .................................................. G11B 5/53
(52) U.S. Cl. ........................ 360/271.5; 360/84; 360/129; 360/281

(58) Field of Search ........................... 360/271.5, 291.6, 360/84, 128, 129, 281

(56) References Cited

U.S. PATENT DOCUMENTS

| 4,285,017 A | * | 8/1981 | Arter et al. | ............... 360/271.5 |
| 5,075,809 A | * | 12/1991 | Heinz et al. | ................. 360/128 |
| 5,278,714 A | * | 1/1994 | Hong | ....................... 360/271.5 |
| 5,483,401 A | * | 1/1996 | Nakajima et al. | .............. 360/84 |
| 6,014,286 A | * | 1/2000 | Tsutaki et al. | ................. 360/84 |

FOREIGN PATENT DOCUMENTS

| JP | 60-20311 | * | 2/1985 |
| JP | 4-87010 | * | 3/1992 |
| JP | 6-223346 | * | 8/1994 |

* cited by examiner

*Primary Examiner*—Jefferson Evans
(74) *Attorney, Agent, or Firm*—Oblon, Spivak, McClelland, Maier & Neustadt, P.C.

(57) ABSTRACT

An assembly including at least one chip with an embedded magnetic head. A base and/or a cover includes at least partially a housing in which the at least one chip is embedded. Such an assembly may find particular application to a magnetic recording system.

13 Claims, 7 Drawing Sheets

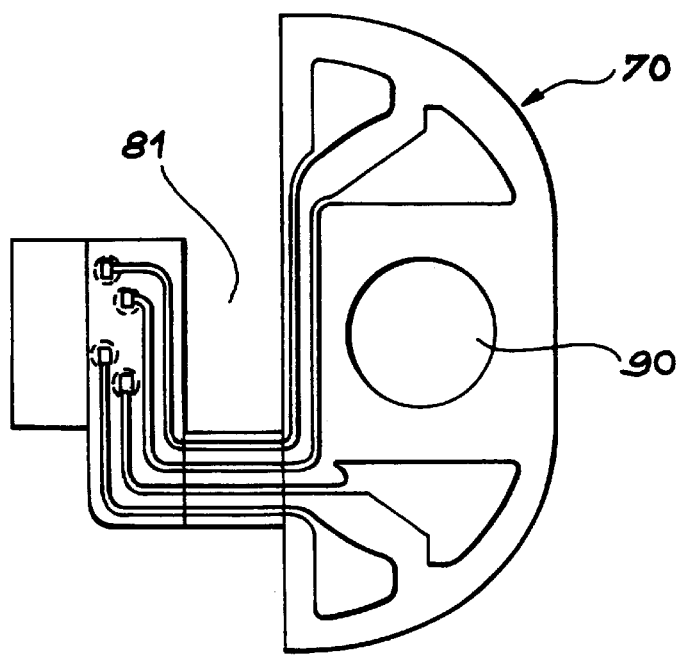
FIG. 11c
FIG. 12
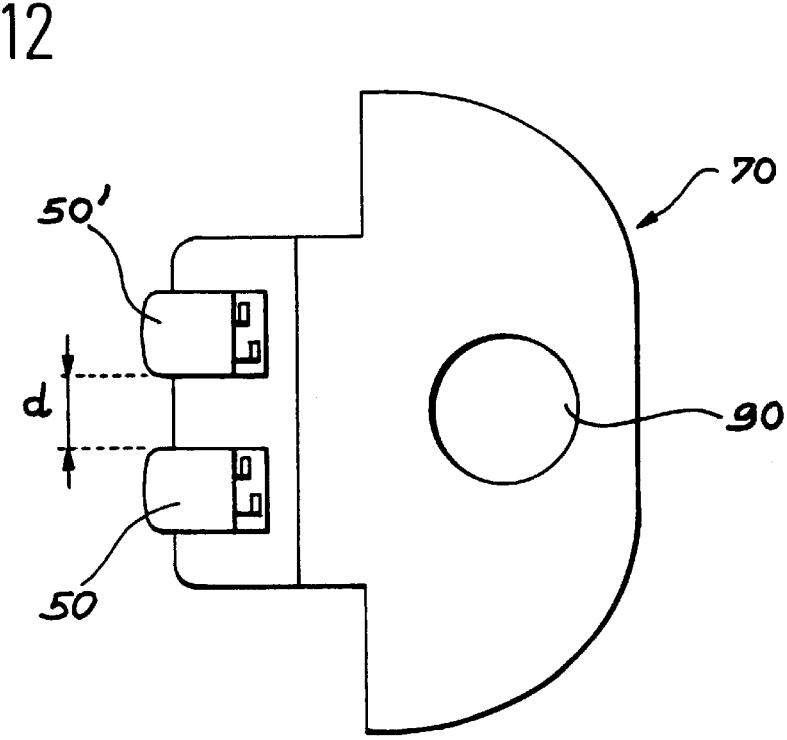

ASSEMBLY COMPRISING AT LEAST ONE EMBEDDED CHIP WITH MAGNETIC HEAD (S)

DESCRIPTION

1. Field of the Invention

This invention involves an assembly including at least one chip with one or more embedded magnetic heads.

It can be applied in particular to making helicoid recording heads for magnetic tape, for example amateur or professional video recording (home VDRs or camcorders) or also for computer data recorders which use tapes or disks. There could also be other applications for other types of recording heads (linear on tape, on cards, etc.).

The high frequencies which are possible due to the small size of the magnetic heads integrated in thin layers allow for digital recording (for example with the DVC norm for video or DDS for data recording). Tape data recording systems are for mass data storage with the highest capacities and at the lowest cost. Its computer applications are archiving of data and backups of hard disks of systems or networks for distribution of large programs or databases.

2. State of the Art

FIGS. 1 to 3 illustrate the structure of a magnetic head integrated in thin layers which is known from document FR-A-2 747 226. As illustrated in FIG. 1, the head includes two polar pieces $10_1$, $10_2$ separated by a head gap 14, two magnetic branches $16_1$, $16_2$ which partly cover the polar pieces, and a magnetic piece for flux closure 18. This set of pieces constitutes a magnetic circuit. Around the branches $16_1$, $16_2$ there are conducting windings $20_1$, $20_2$ for reading and/or writing of the information written and/or read on the recording medium (not shown).

FIG. 2 shows the complete head with two conducting strips $22_1$, $22_2$ allowing for access to the conducting windings $20_1$, $20_2$ and two electrical connection studs $24_1$, $24_2$.

The head shown in FIGS. 1 and 2 can be made collectively using micro-electronics techniques. To obtain a chip with one or several magnetic heads from a card which includes several components or chips, the components must be separated from each other and then the front part of the components next to the polar pieces $10_1$, $10_2$ must be machined to give them the rounded shape needed for proper functioning of the head. In FIG. 2, the rounded profile is schematically represented by the line 26.

FIG. 3 schematically shows a section view of a head along a line AA which goes through one of the conducting strips and one of the branches of the magnetic circuit as well as the head support. This figure shows a substrate 30, silicon for example, with one of the polar pieces $10_1$ or $10_2$, a magnetic branch $16_1$ or $16_2$, a conducting strip $22_1$ or $22_2$, and the electrical connection studs $24_1$, $24_2$. This unit is covered by a superstrate 40, in silicon for example. At the front of the head, the surface 26, called the bearing surface, has an appropriately rounded shape and a height h which is reduced with respect to the total thickness of the unit. At the back, the superstrate 40 is disengaged to leave the electrical connection studs $24_1$, $24_2$ exposed.

The chip (or chips) is mounted on a base 45, made of brass for example, on one of the sides of which there is a rigid printed circuit 46 which is electrically linked to the chip by stranded wires $48_1$, $48_2$. The printed circuit 46 links the head to the electronic circuits which control writing and/or reading.

The current chips for helicoidal recording are mounted on and glued to their bases. This gluing is done on the reference plane of the base, machined to give it good evenness, so that the head is perfectly parallel to the reference plane of the drum to which the base will be screwed. The position can be adjusted with the screw.

The current assemblies are poorly adapted to miniaturisation of heads, because the mechanical resistance of the chip on a single gluing side of the base is not sufficient when the size of the head becomes very small. In the future, integrated heads will progressively replace micro-machined heads, because they are much better suited to increasing the density of information. The heads will thus be smaller and smaller. The base must be adapted as a consequence. Gluing the chip to a single plane is not sufficient because it does not ensure good mechanical resistance of the head when it is working.

The Japanese patent application 60-020311 describes a support-magnetic head assembly in which a chip is introduced in a groove made at the front of the base.

Japanese patent application 07-296325 describes a support-magnetic head assembly in which the head abuts the bottom of a housing.

SUMMARY OF THE INVENTION

This invention aims to improve the resistance of the head (or heads) in its (their) support.

To this end, the invention proposes a chip(s)-base assembly characterised in that it includes a base and a cover over at least part of the chip(s), the chip(s) being embedded in a housing between the base and the cover. This embedded housing can be located either completely within the base, or completely within the cover, or partially within the base and partially within the cover.

In the case of a single chip, the chip having two lateral sides, an upper side, a lower side and a rear side, at least one of these sides can be glued to the wall of the embedded housing. At least two sides can possibly be glued. The lower side of the chip can also be glued to the bottom of the housing, keeping in mind that, without particular precautions, the thickness of the glue could affect the positioning of the chip. Thus glued and embedded, the chip is held solidly on the base.

The chip can also, in certain cases, be glued to the cover. This cover can be a hollow piece fitting against the base.

The chip can include one or several magnetic heads. There can also be several chips on the base, each embedded in a housing (or in the same housing), ensuring its relative positioning with respect to the others both laterally and in terms of depth.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 11a, 11b and 11c show a rigid printed circuit allowing for making of a cover, (11a in overhead view, 11b profile with base with deep embedding, 11c variant with notch);

FIG. 12 is an overhead view of a base with two chips with single heads embedded at controlled distances.

DESCRIPTION OF PARTICULAR EMBODIMENTS

Figure 1:
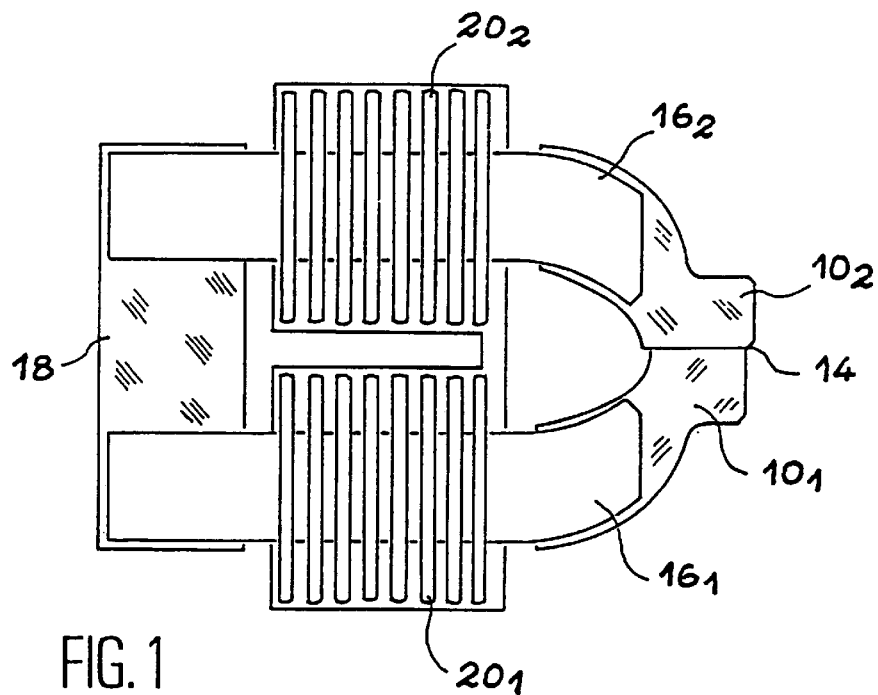
FIG. 1, already described, shows a magnetic head according to the state of the art.
Figure 2:
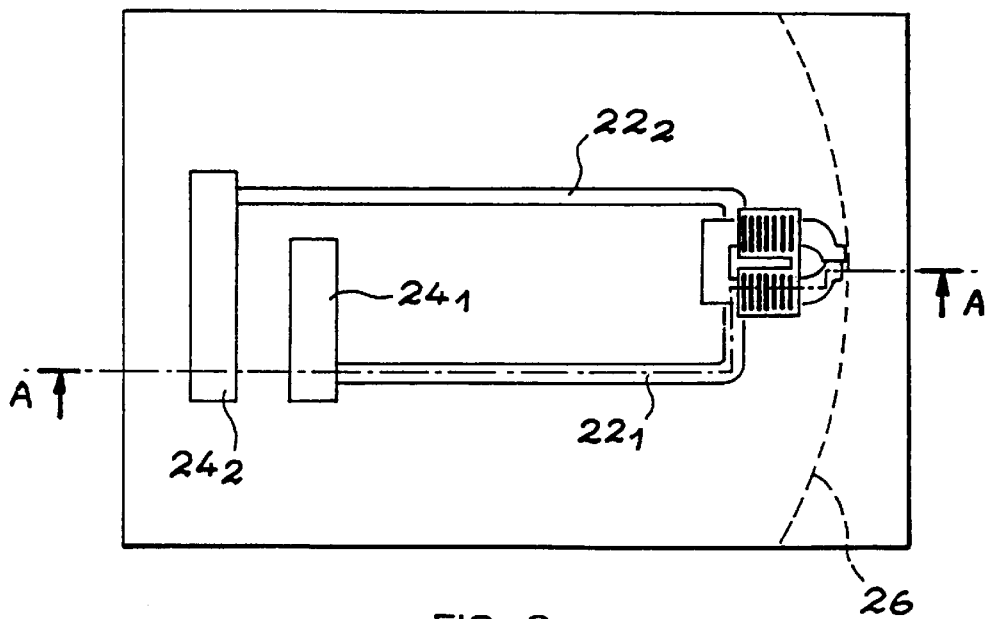
FIG. 2, already described, shows, in an overhead view, a magnetic head with its electric connection studs.
Figure 3:
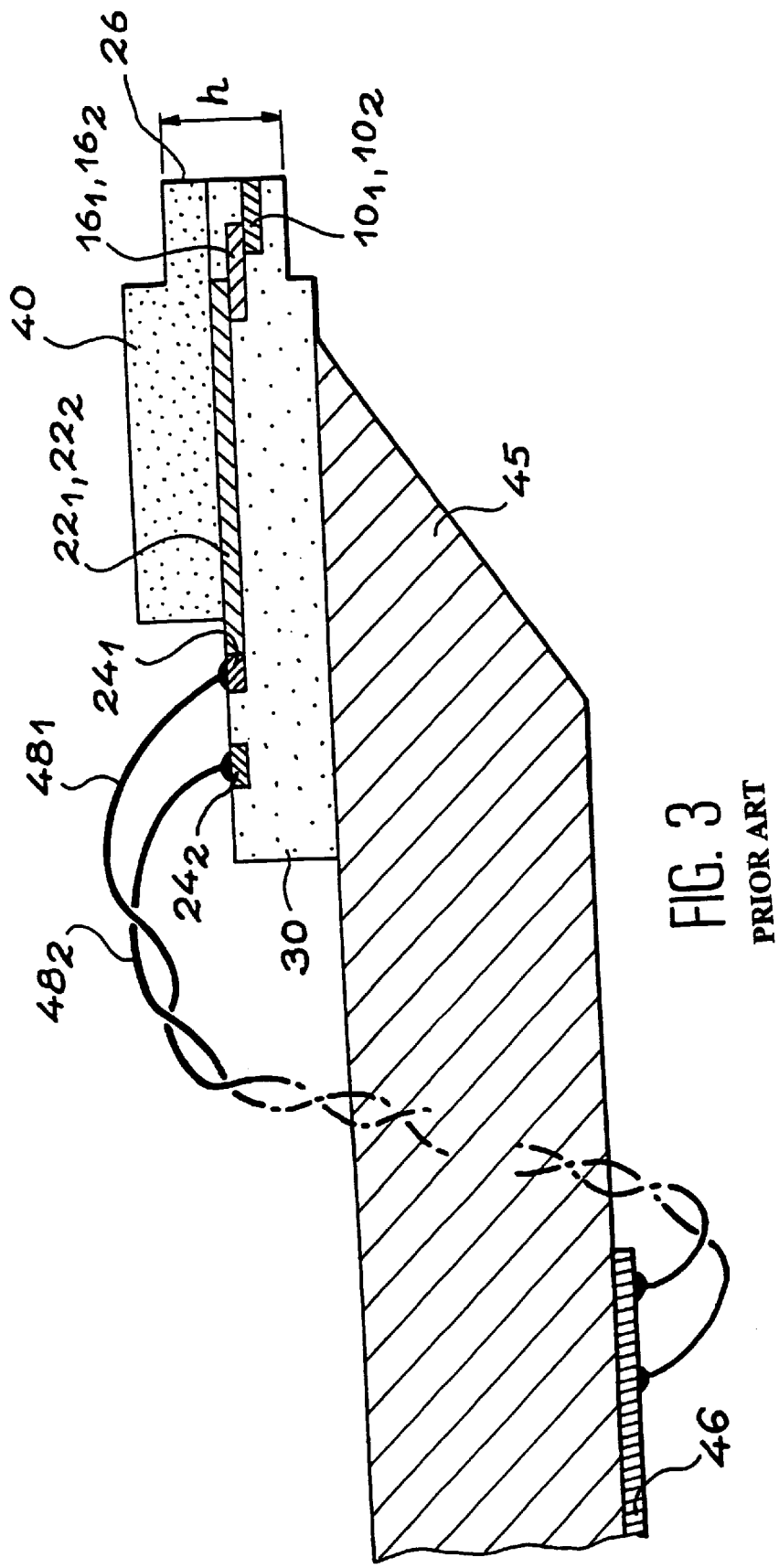
FIG. 3, already described, shows the same head in a cross-section and assembled on its base.
Figure 4:
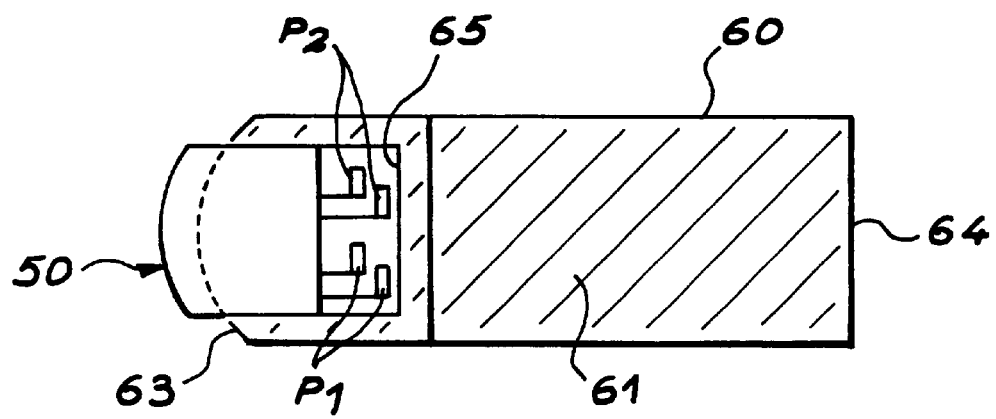
FIG. 4 is an overhead view of an assembly according to the invention.

FIG. 4 shows a chip 50 which is assumed to contain two magnetic heads. The chip thus includes, on its rear edge, two double electrical connection studs, $P_1$, $P_2$. There is also a base 60 with an upper side 61, a front side 63 and a rear side 64. The side 61 acts as a reference plane. It can be machined to adapt the position of the head 50 to the desired height. The chip 50 is embedded in the base 60, in a housing 65 provided at the front of the base.

Figure 5:
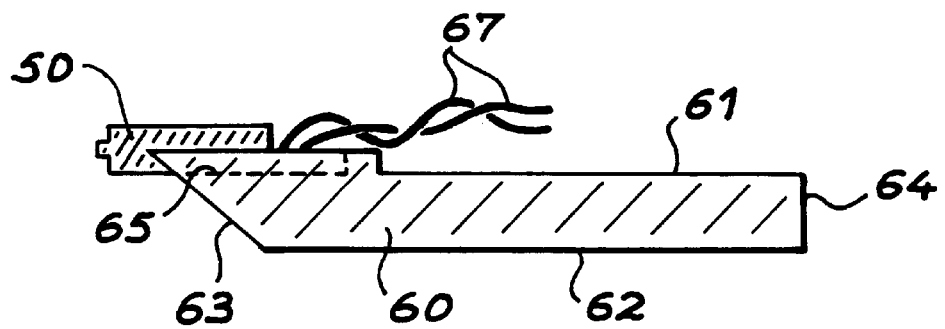
FIG. 5 is a side view of the assembly according to the invention.

FIG. 5 shows the same elements with the same numerical references but in a side view. The connection wires 67 are also seen.

In the variant illustrated, the chip is embedded in the housing 65 over about half of its height. Its two lateral sides are thus in contact with the lateral walls of the housing, over half of their height. One and/or the other of these sides can be glued to the walls of the housing.

Figure 6:
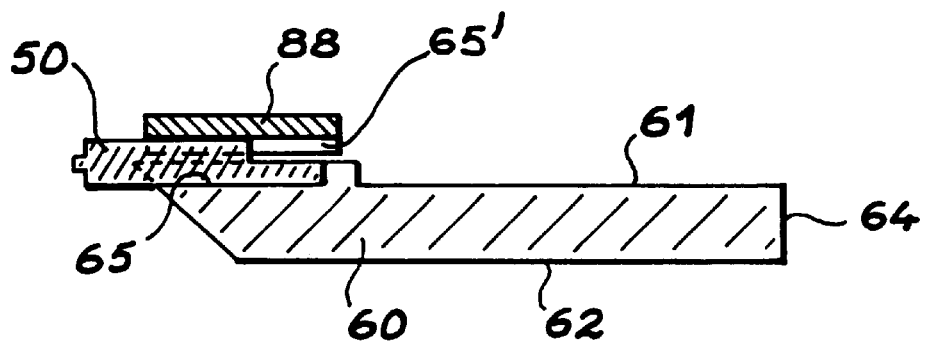
FIG. 6 shows a section of the assembly with a cover.

FIG. 6 illustrates a variant in which the cover 88 fits against the base 60. An embedded housing 65' can be machined in the cover 88. The chip 50 is then partially embedded in the base (housing 65) and partially in the cover 88 (housing 65'). But the chip can also be embedded only in the cover.

This invention can be combined with the invention described and claimed in the French patent application entitled "Assembly for chip(s) with magnetic head(s) and manufacturing process" submitted on Aug. 21, 1998. This combination is illustrated in FIGS. 7 to 11.

Figure 7:
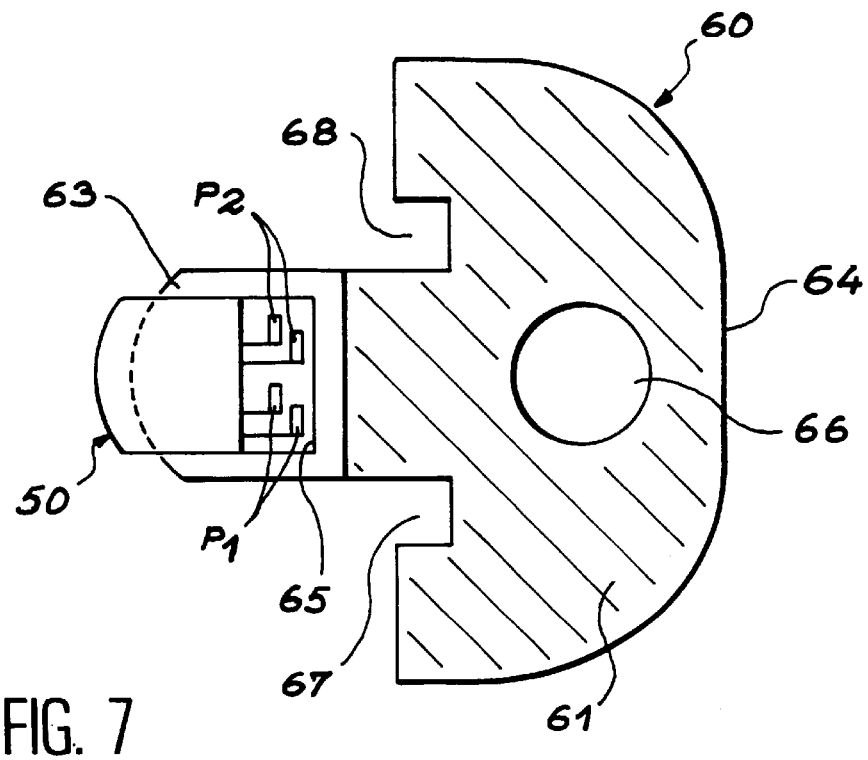
FIG. 7 illustrates a particular embodiment of the base.

FIG. 7 shows the particular shape of the base 60 with the enlarged rear part, a hole 66 and two notches 67, 68 located in the middle part.

Figure 8:
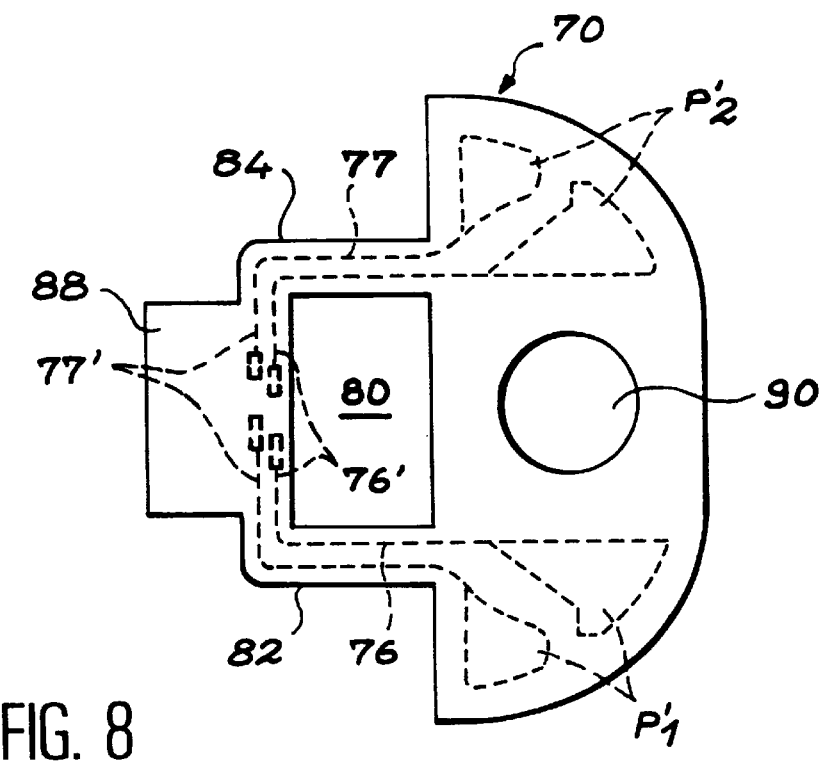
FIG. 8 is an overhead view showing a rigid printed circuit allowing for making of a cover and establishing an electrical connection.

FIG. 8 shows a rigid printed circuit 70 with conducting tracks 76, 77 arranged on the lower side of the circuit, these tracks having front ends 76', 77' placed so that they are above the connection studs P1, P2 of the chip when the printed circuit is in place. At the rear ends of the conducting tracks 76 and 77, there are two pairs of connection studs $P'_1$, $P'_2$ which can connect with an electronic circuit (not shown).

The rigid printed circuit 70 also includes an opening 80 which is essentially rectangular and bordered by two lateral strips 82, 84. This opening 80 is sufficiently wide so that the chip-base unit in FIG. 7 can be put into it. The lateral strips 82, 84 of the printed circuit go through the notches 67, 68 in the base. The rigid printed circuit contains a hole 90, of the same diameter as the hole 66 made in the base to allow for insertion of the means of attachment. The rigid printed circuit also has, at the font, a rigid piece 88 which acts as a cover for the chip. It can be glued to the chip and/or to the base.

This cover reduces the risks of vibration, a valuable feature for drums which turn rapidly, for example at 9000 rotations/minute.

Figure 9:
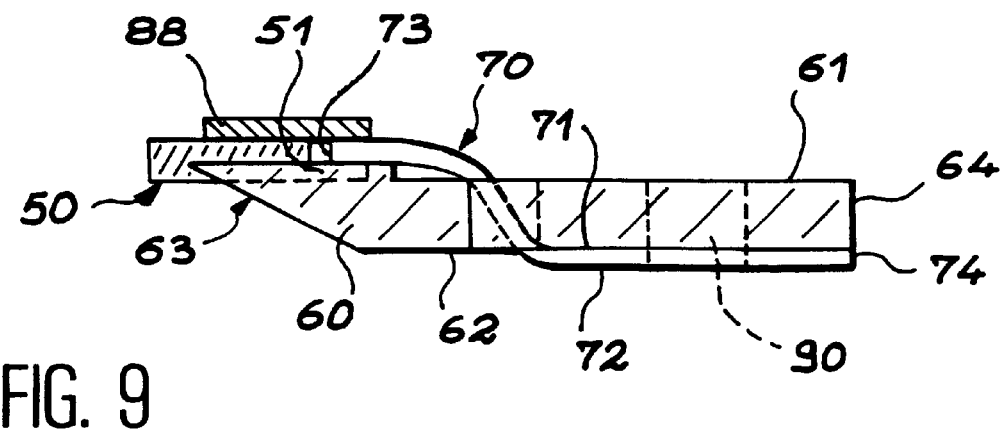
FIG. 9 is a cross section of the chip-base-printed circuit assembly.
Figure 10:
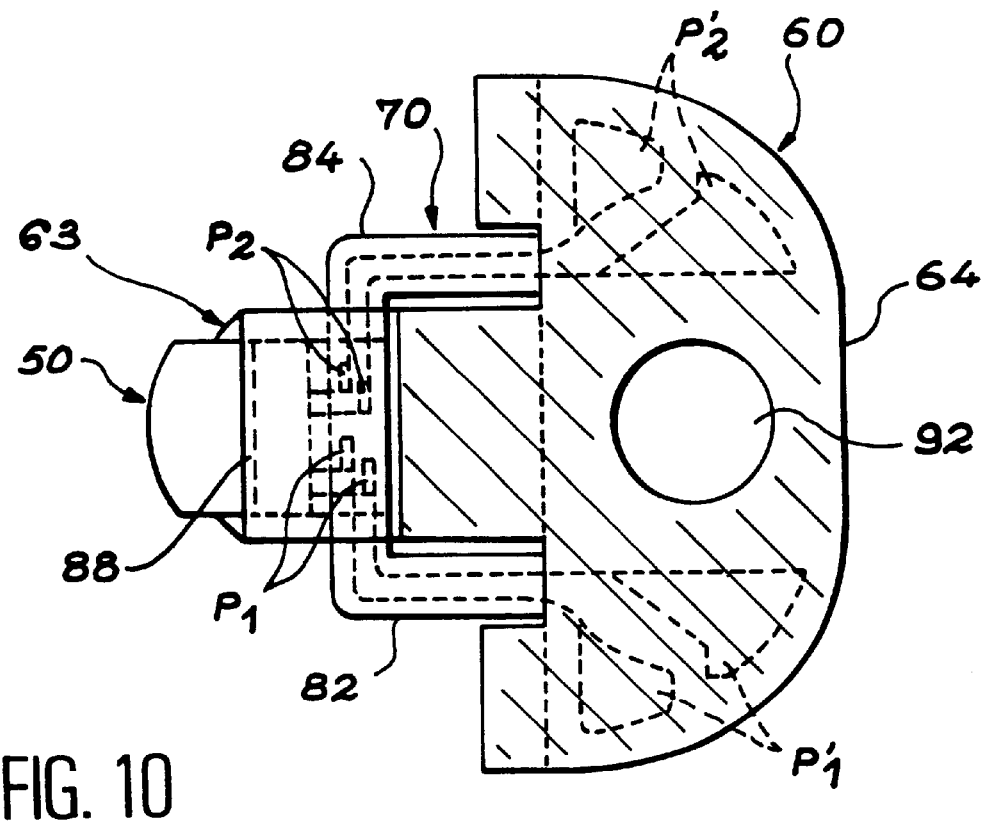
FIG. 10 shows this assembly in an overhead view.

FIGS. 9 and 10 show the assembly obtained, in side view and overhead view respectively. The references indicate the same elements as in FIGS. 7 and 8. FIG. 9 shows, in particular, that the printed circuit 70 has its upper side 71 which comes against the lower side 62 of the base 60 and its lower side 72 which comes into contact with the connection studs of the chip 50. FIG. 9 also shows an attachment hole 90 which allows for assembly of the head on a drum by means of a screw.

FIG. 10 shows the same elements and the lateral sides 82 and 84 using the notches made in the base.

The positioning of the cover on the chip-base unit can be done automatically using a video camera and a shape recognition program.

Figure 11A:
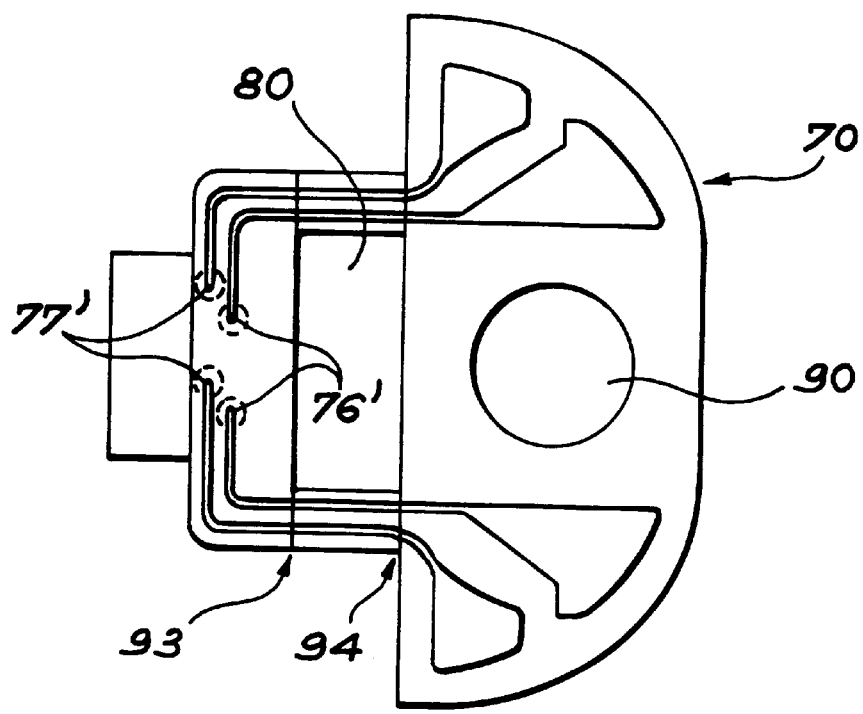

FIG. 11a shows, in an overhead view, an example of a printed circuit with a rigid cover with printed connection tracks and a central hole 80 for the base.

Figure 11B:
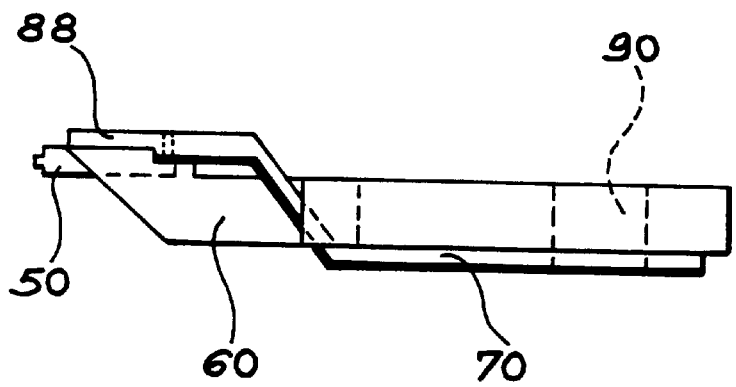

The breaks or edges 93 and 94 show that this cover is made on two levels, visible on FIG. 11b: a first level located on the base, partly covering the chip(s) 50 and electrically connecting the studs 76', 77' of the tracks 76, 77 to the studs $P_1$, $P_2$ of the chips, a second level located under the base equipped with studs $P'_1$, $P'_2$ to connect this assembly to the signal processing electronics. FIG. 11b shows this cover positioned on its base in a side view. The base is shown with deep embedding of the chip 50.

FIG. 11c shows a variant of the rigid cover with a notch instead of the central hole, allowing for a side assembly and an adaptation to bases of different shapes.

FIG. 12 shows an example of a base with two embedded chips with individual heads. The distance "d" between the chips can be precisely defined by the position of the housings in which the chips will be embedded. The height of the heads (position on the axis perpendicular to the plane of FIG. 12) can be defined either by the depth of the housings, or by the position of the polar pieces of the heads in the chip.

There could also be bases with several housings for chips with one or several heads per chip, equipped with a cover which could electrically connect the heads to the printed circuit of the assembly.

What is claimed is:

1. An assembly comprising:
   at least one chip with at least one magnetic head;
   a base;
   a cover over at least part of the at least one chip, the at least one chip being recessed in a housing between the base and the cover;
   wherein the cover is composed of a front part of a printed circuit with a lower side covered with conducting tracks in contact with connection studs of the at least one chip located at a rear of the chip.

2. An assembly according to claim 1, in which the embedded housing is located either entirely in the base or entirely in the cover.

3. An assembly according to claim 1, in which the embedded housing is located partially in the base and partially in the cover.

4. An assembly according to claim 1, in which at least one of the sides of the chip is glued to the walls of the housing.

5. An assembly according to claim 1, in which the cover fits onto the base.

6. An assembly according to claim 1, in which plural chips are embedded in one or plural housings at a precise position which defines their separation with respect to neighboring chips, their height being defined by the depth of the one or plural housings.

7. An assembly comprising:
   at least one chip with at least one magnetic head and at least one connection stud;
   a base;
   a cover over at least part of the at least one chip, the at least one chip being embedded over about one half of its height in a housing between the base and the cover.

8. An assembly according to claim 7, in which the embedded housing is located either entirely in the base or entirely in the cover.

9. An assembly according to claim 7, in which the embedded housing is located partially in the base and partially in the cover.

10. An assembly according to claim 7, in which the at least one of the sides of the chip is glued to the walls of the housing.

11. An assembly according to claim 7, in which the cover fits onto the base.

12. An assembly according to claim 7, wherein the cover is composed of a front part of a printed circuit with a lower side covered with conducting tracks in contact with connection studs of the at least one chip located at a rear of the chip.

13. An assembly according to claim 7, in which plural chips are embedded in one or plural housings at a precise position which defines their separation with respect to neighboring chips, their height being defined by the depth of the one or plural housings.

* * * * *

UNITED STATES PATENT AND TRADEMARK OFFICE
CERTIFICATE OF CORRECTION

PATENT NO. : 6,356,416 B1
DATED : March 12, 2002
INVENTOR(S) : Albertini

It is certified that error appears in the above-identified patent and that said Letters Patent is hereby corrected as shown below:

<u>Title page,</u>
Item [75], the Inventor's information should read:
-- (75)  Inventor:  Jean-Baptiste Albertini, Grenoble (FR) --

Signed and Sealed this

Twenty-fifth Day of June, 2002

*Attest:*

*Attesting Officer*

JAMES E. ROGAN
*Director of the United States Patent and Trademark Office*